United States Patent [19]

Bartlett et al.

[11] 4,342,535

[45] Aug. 3, 1982

[54] DOOR-OPENER APPARATUS

[75] Inventors: Donald S. Bartlett, Troy; Theodore J. Beaulieu, Warren, both of Mich.

[73] Assignee: General Motors Corporation, Detroit, Mich.

[21] Appl. No.: 178,172

[22] Filed: Aug. 14, 1980

[51] Int. Cl.³ .............................................. B25J 5/02
[52] U.S. Cl. ............................................... 414/744 A
[58] Field of Search ............... 414/1, 4, 7, 373, 684.3, 414/744 R, 744 A, 917; 74/469, 519, 521, 582

[56] References Cited

U.S. PATENT DOCUMENTS

| | | | |
|---|---|---|---|
| 3,160,290 | 12/1964 | Wilson | 414/4 X |
| 3,703,968 | 11/1972 | Uhrich et al. | 414/917 X |
| 3,995,746 | 12/1976 | Usagida | 414/917 X |
| 3,995,756 | 12/1976 | Hjelm | 414/917 X |

FOREIGN PATENT DOCUMENTS

| | | | |
|---|---|---|---|
| 623732 | 7/1978 | U.S.S.R. | 414/917 |
| 697316 | 11/1979 | U.S.S.R. | 414/917 |

Primary Examiner—Johnny D. Cherry
Attorney, Agent, or Firm—Edward J. Biskup

[57] ABSTRACT

An apparatus having a pivoted arm mounted on a base for seizing and releasing an article that is hinged at one end and which includes a control link that maintains a fixed length while the arm moves the article about its hinged end between preset positions, but changes its length and thereby provides a signal indicating that the arm has seized the article when the latter is moved in a direction opposite to the normal movement.

3 Claims, 7 Drawing Figures

DOOR-OPENER APPARATUS

This invention, in general, concerns an apparatus for moving an article between preset positions and, more particularly, an apparatus which serves to open and close the door of a vehicle while the latter is conveyed through a paint booth.

More specifically, the present invention contemplates an apparatus having an article gripper which is power-operated for seizing and releasing the door of a vehicle as the vehicle is transported along a path past the apparatus. In the preferred form of the invention, the apparatus includes a carriage that is movable in either direction along a rail located adjacent to and parallel to a track along which the vehicle is conveyed. The carriage supports one end of a primary arm for pivotal movement about a first vertically orientated pivot axis, and the other end of the primary arm, in turn, supports an intermediate portion of a secondary arm for pivotal movement about a second vertically orientated pivot axis. The carriage also supports one end of a control link for pivotal movement about a third vertically orientated pivot axis which is spaced from the first pivot axis. The other end of the control link is pivotally connected to the secondary arm adjacent the second pivot axis for movement about a fourth vertically orientated pivot axis. The article gripper is mounted to the free end of the secondary arm and, upon command, is adapted to seize or release a rod attached to the hinged door of the vehicle. A motor is connected to the primary arm for moving the latter about the first pivot axis so as to cause the article gripper to move toward or away from the carriage along a programmed path for opening and closing the hinged door. The control link is collapsible but normally maintains a preset length during the opening and closing movements of the door for controlling such movement. However, when a predetermined force is applied to the control link along its longitudinal axis, the length of the control link is shortened, causing an associated switch to be actuated for providing a signal that the article gripper has seized the hinged door.

The objects of the present invention are: to provide a new and improved door-opener apparatus which works in conjunction with an automatic spray device for painting the inside of a vehicle door; to provide a new and improved apparatus for automatically opening and closing a vehicle door as the vehicle sheet metal body is being conveyed through a paint booth; to provide a new and improved apparatus for opening and closing a vehicle door and that is characterized in that the apparatus has an article gripper pivotally supported on a movable carriage for seizing and releasing the vehicle door and also includes means responsive to the movement of the carriage after the article gripper moves toward the carriage for indicating whether or not the article gripper has seized the door; and to provide a new and improved apparatus having an arm mounted on a carriage for seizing and releasing an article and which includes a control link that maintains a fixed length while the arm moves the article, but changes its length to indicate that the arm has seized the article when the latter is moved in a direction opposite to the normal movement.

Other objects and advantages of the present invention can be derived from the following detailed description when taken with the accompanying drawings, in which.

Figure 1:
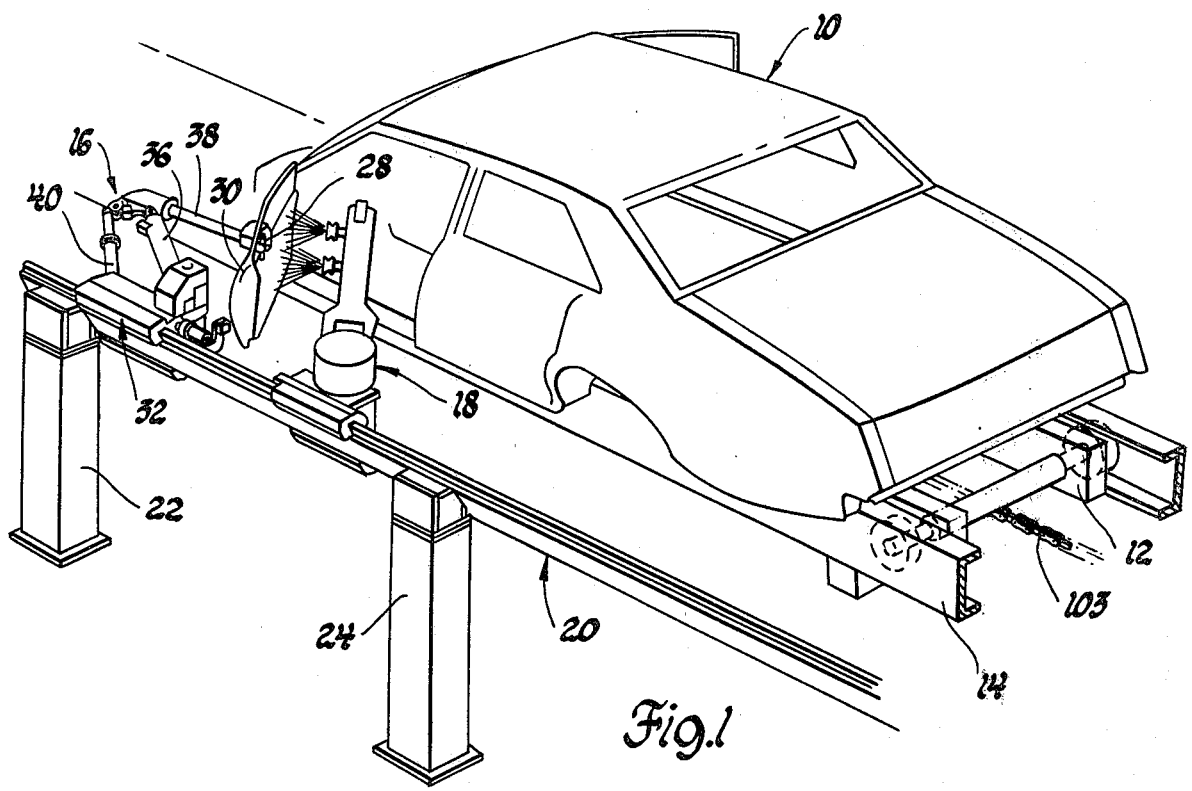
FIG. 1 is a perspective view showing a sheet metal vehicle body being conveyed past a door-opener apparatus made in accordance with the present invention.
Figure 2:
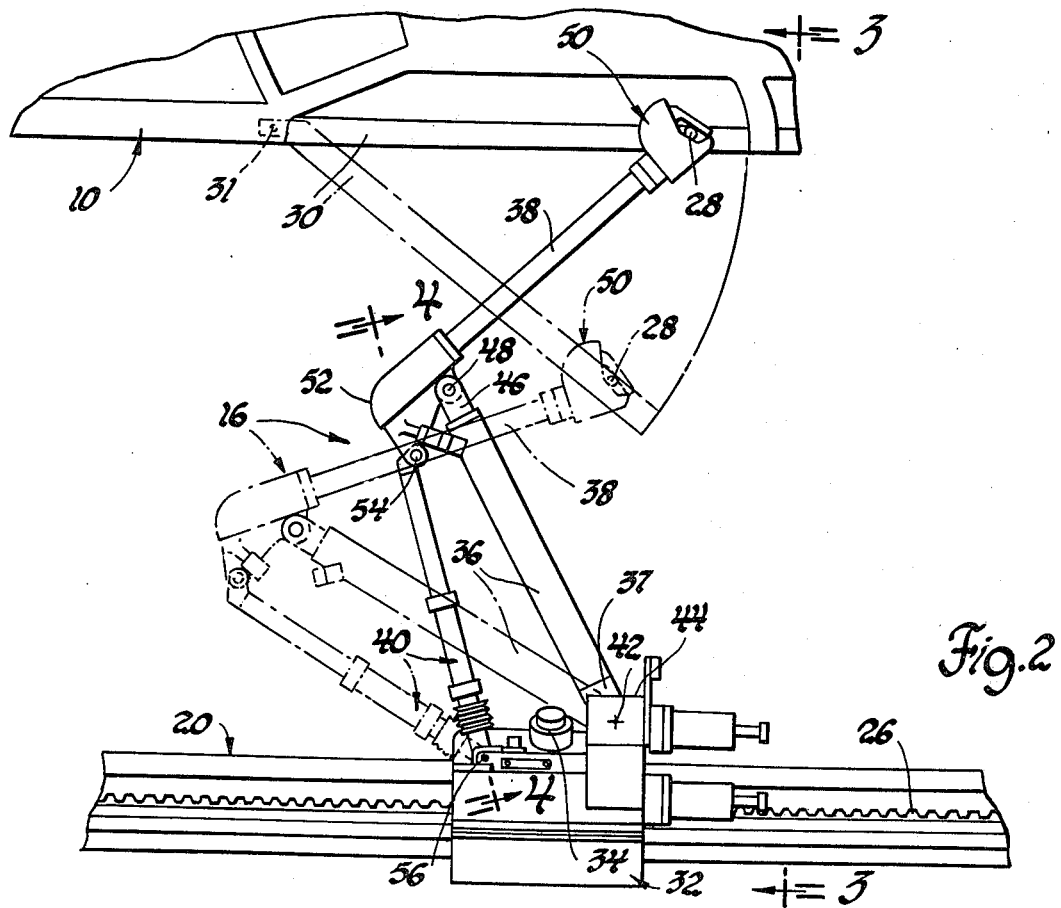
FIG. 2 is a plan view showing the door-opener apparatus of FIG. 1.
Figure 3:
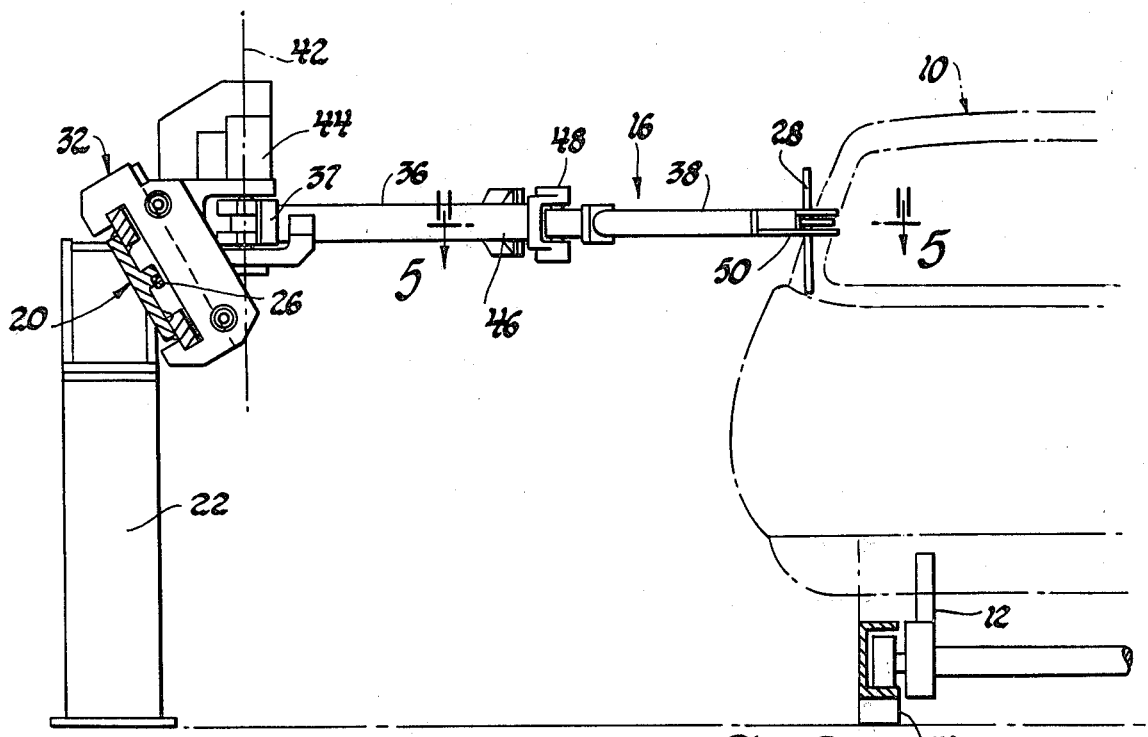
FIG. 3 is a sectional view taken on line 3—3 of FIG. 2.

Referring to the drawings, and more particularly to FIG. 1 thereof, a vehicle body 10 made of sheet metal is shown mounted on a carrier 12 and being conveyed along a track 14 through a conventional paint booth which, in this case, houses a door-opener apparatus 16 made in accordance with the present invention and that works in conjunction with a paint robot 18. Both the door-opener apparatus 16 and the paint robot 18 are supported on a horizontal guide rail 20 for movement in either direction along a path that is parallel to the path of travel of the vehicle body 10. The guide rail 20 is mounted on spaced stanchions, two of which are shown in FIG. 1 and identified by the reference numerals 22 and 24. In addition, and as seen in FIG. 2, the guide rail 20 is formed with a rack 26 that is engaged by appropriate toothed gearing (not shown) which forms a part of both the door-opener apparatus 16 and the paint robot 18 for causing driving movement of each of these devices along the guide rail 20. As seen in FIG. 1, the door-opener apparatus 16 is adapted to seize a vertical door rod 28 which is part of a fixture removably mounted to the inner panel of a vehicle door 30 and to cause the door to be moved about its hinged connection 31 to an opened position so that the inside of the door 30 can be painted by the paint robot 18 during the painting operation of the vehicle body 10. Thereafter, and as will be more fully explained in the description of the the operation, the door 30 is closed by the door-opener apparatus 16 and the door rod 28 is released, after which the door-opener apparatus 16 returns to the "ready" position, awaiting the arrival of another vehicle body for repeating the door opening and closing operation. It will be noted that both the door-opener apparatus 16 and the paint robot 18 are intended to be program-controlled so that their movements and positions can be coordinated during the painting operation.

Referring now to FIGS. 1 through 5, the door-opener apparatus 16 constructed in accordance with the present invention comprises a carriage 32 which is supported for sliding movement along the guide rail 20. The carriage 32 houses the aforementioned toothed gearing which meshes with the teeth of rack 26. A rotary hydraulic motor 34, mounted on the carriage 32, serves to drive the toothed gearing and thereby causes the carriage 32 to move in either direction along the guide rail 20. The door-opener apparatus 16 also includes a primary arm 36, a secondary arm 38, and a control link 40-all of which are connected to and supported by the carriage 32. In this regard, it will be noted that the primary arm 36 has its inner end 37 supported by the carriage 32 for rotary movement about a vertical axis 42 and is driven about the vertical axis 42 by a hydraulic vane motor 44. The outer end 46 of the primary arm 36 is connected by a pivotal connection 48 to an intermediate portion of the secondary arm 38, one end of which is formed with a gripper 50. The other end 52 of the secondary arm 38 is connected by a pivotal connection 54 to one end of the control link 40. The other end of the control link 40 is connected to the carriage 32 by a pivotal connection 56 which is spaced from the vertical axis 42.

Figure 4:
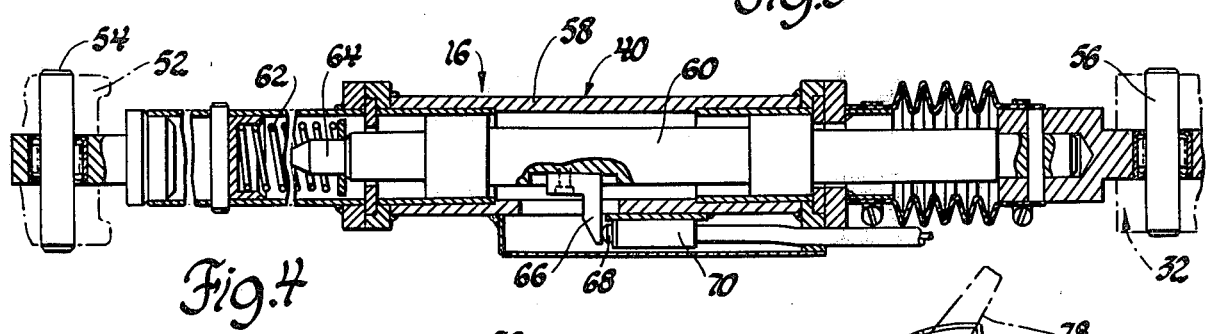
FIG. 4 is an enlarged longitudinal sectional view taken on line 4—4 of FIG. 2.

Both the primary arm 36 and the secondary arm 38 are formed as rigid members of predetermined lengths. The control link 40, on the other hand, comprises a cylindrical member 58 and a double-headed piston member 60 which can move relative to each other in an axial direction. In this regard and as best seen in FIG. 4, the cylindrical member 58 and piston member 60 are normally held in fixed positions relative to each other by a coil spring 62 housed in one end of the cylindrical member 58. The spring 62 engages the pointed inner end 64 of the piston member 60 and exerts a predetermined amount of biasing force therein so that the cylindrical member 58 and piston member 60 normally maintain the relative positions of FIG. 4. Under certain conditions to be explained, the biasing force of the spring 62 can be overcome so as to cause the control link 40 to shorten in length. When this occurs, a dog 66, rigidly connected to the piston member 60, moves away from a button 68, which is part of a switch 70 fixed with the cylindrical member 58, so as to cause the contacts (not shown) of the switch 70 to be closed and thereby generate a signal which indicates that the door-opener apparatus 16 has in fact opened the vehicle door 30. This signal then allows the paint robot 18 to move in and paint the inside of the vehicle door 30.

Figure 5:
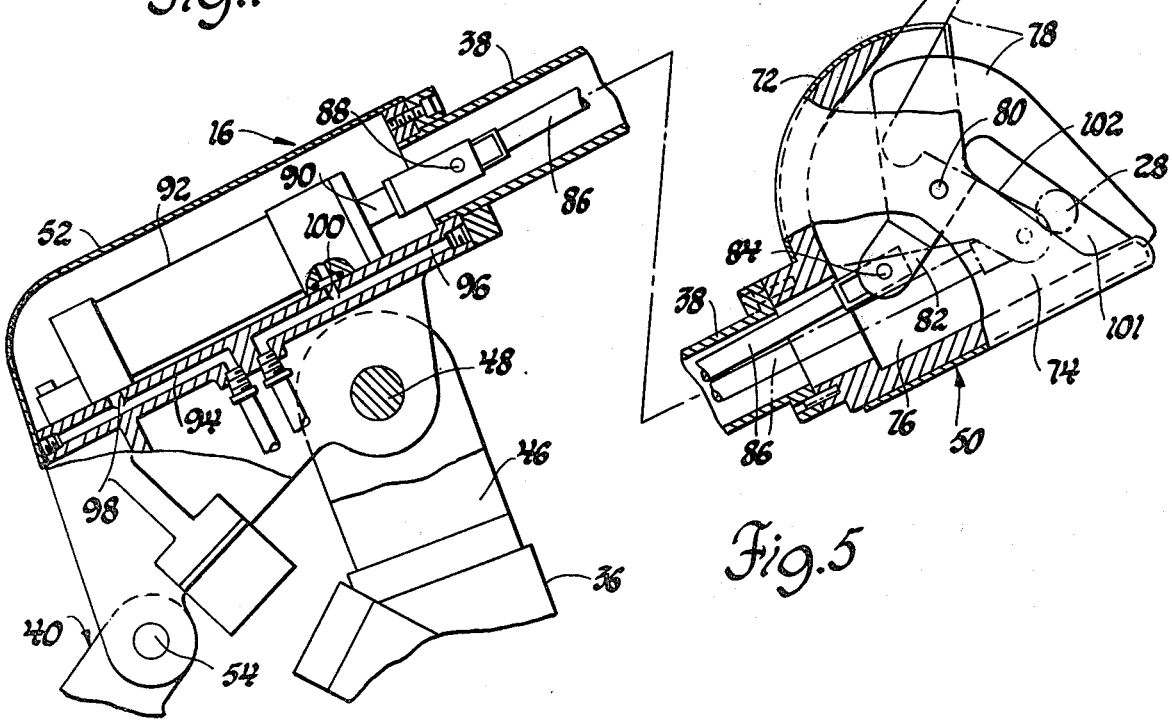
FIG. 5 is an enlarged sectional view taken on line 5—5 of FIG. 3.

The gripper 50, which forms a part of the secondary arm 38, can best be seen in FIG. 5 and comprises a generally round housing 72 which includes a pair of side walls 74 and 76. A jaw 78 is supported in the housing 72 for rotation about a shaft 80, the opposite ends of which are fixed to the side walls 74 and 76. The jaw 78 is formed with a tab 82 which is connected by a pivotal connection 84 to one end of a link 86 which extends rearwardly and is connected by a pivotal connection 88 with the piston rod 90 of an air cylinder 92. The air cylinder 92 is adapted to receive pressurized air from any suitable source (not shown) that can flow through passages 94 and 96 which respectively lead to ports 98 and 100 formed at opposite ends of the air cylinder 92. Thus, when pressurized air is directed through passages 94 and 96 to the port 98 while venting port 100, the piston rod 90 will move to the right causing the link 86 to rotate the jaw 78 from the full-line closed position to the phantom-line opened position shown in FIG. 5. It will be noted that when the jaw 78 is in the full-line position shown in FIG. 5, it cooperates with the housing 72 for seizing and maintaining the door rod 28 in a fixed position within a slot 101 that is defined by the space between the jaw 78 and the outer edges 102 of the housing side walls 74 and 76. When the jaw 78 moves to the phantom-line position, the door rod 28, of course, is released.

Figure 6:
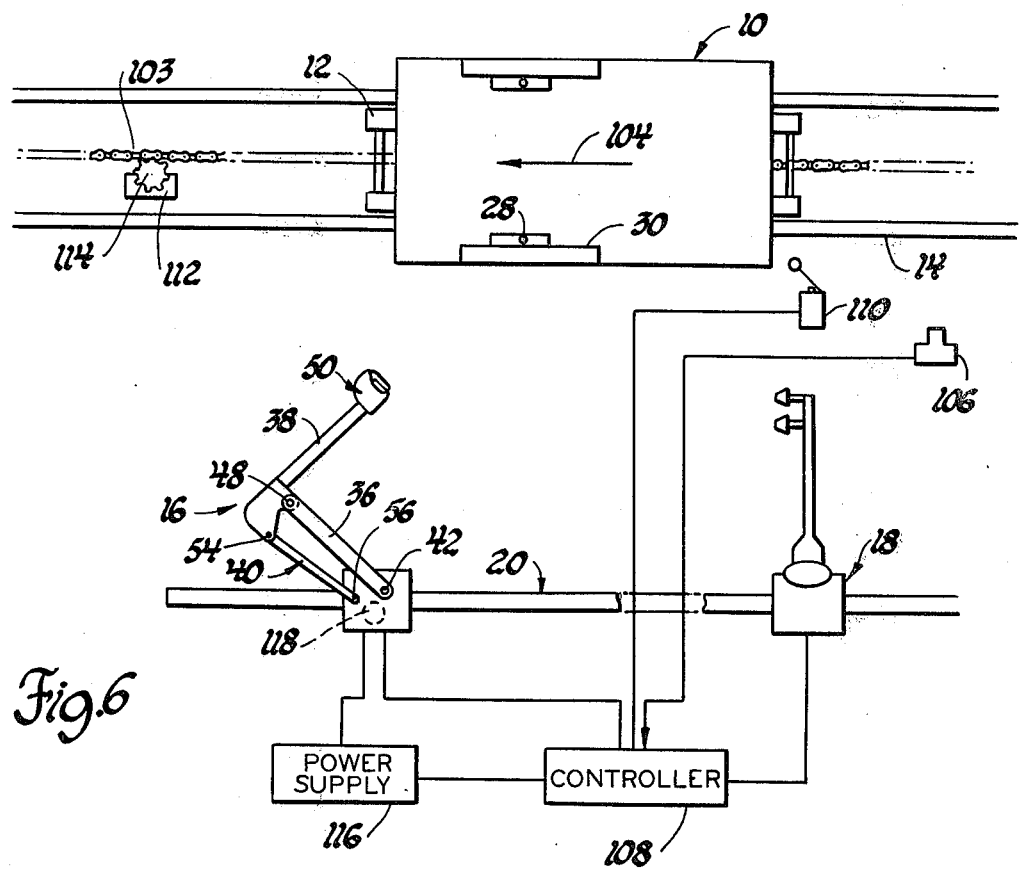
FIG. 6 is a schematic diagram showing the door-opener apparatus combined with the control components.
Figure 7:
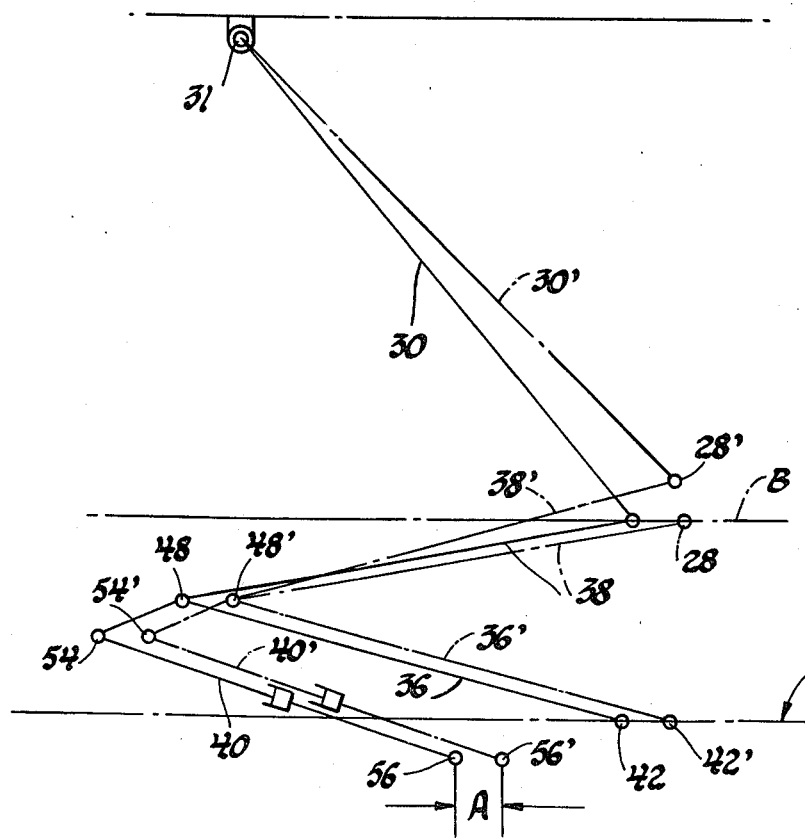
FIG. 7 is a schematic diagram of the door-opener apparatus, showing its movement from one position to another for determining whether or not it has seized the vehicle door.

The operation of the door-opener apparatus 16 described above is as follows. As seen in FIGS. 1 and 6, a traveling conveyor chain 103 is fastened to the carrier 12 and causes the latter to move in the direction of the arrow 104 into the paint booth. The sheet metal vehicle body 10, mounted on the carrier 12, arrives with the vehicle door 30 closed and with the door rod 28 fastened to the inner panel of the vehicle door 30. As the sheet metal vehicle body 10 enters the work station wherein the door-opener apparatus 16 and the paint robot 18 are located, it passes a model-recognition detector 106 which sends a signal to a controller 108. The moving vehicle body 10 then trips a limit switch 110 which tells the controller 108 to start reading the counts from a conveyor resolver 112 which is attached to the chain 103 through a sprocket 114. A feedback signal is then sent to the controller 108 from the paint robot 18; the controller 108 then directs the power supply 116 to synchronize the position of the carriage 32 on the guide rail 20 by counting the pulses of a resolver 118, associated with the toothed gearing in the carriage 32 which meshes with the rack 26, and comparing such pulses to the position of the rod 28 attached to the vehicle door 30, as indicated by the conveyor resolver 112. When the carriage 32 is properly positioned relative to the door rod 28, the controller 108 commands the hydraulic vane motor 44 to rotate in a clockwise direction moving the primary arm 36 to the fully extended position shown in full lines in FIG. 2. After the primary arm 36 is fully extended, the controller 108 then causes the air cylinder 92 to extend, which then closes the jaw 78 of the gripper 50 on the door rod 28. The controller 108 then causes the hydraulic vane motor 44 to rotate the primary arm 36 in a counterclockwise direction about the vertical axis 42. At the same time, the movement of the carriage 32 along the guide rail 20 is coordinated with the travelling movement of the vehicle body 10, permitting the vehicle door 30 to be moved to the opened position shown in phantom lines in FIG. 2. Once the vehicle door 30 is moved to the opened position shown in FIG. 2, the controller 108 then causes the carriage 32 to move a short distance in an opposite direction. This reverse movement is shown in FIG. 7 wherein the various parts of the door-opener apparatus 16 and the vehicle door 30, when located in the fully door-opened position, are shown schematically and are identified by the same reference numerals previously used herein for identifying the particular parts. Also, the same reference numerals (but primed) are used to schematically show the new position of the various parts of the door-opener apparatus 16 and the vehicle door 30 when the carriage 32 is moved the aforementioned short distance (indicated by the letter A in FIG. 7), in the opposite direction after the vehicle door 30 is opened. At such time if the gripper 50 has in fact seized the door rod 28 and fully opened the vehicle door 30, then the movement of the carriage 32 causes the door-opener apparatus 16 and the vehicle door 30 to assume the new position indicated by primed reference numerals. Thus, the pivotal connection 56 and the vertical axis 42 about which the primary arm 36 rotates move to the positions indicated by the reference numerals 56' and 42'. At the same time, the door rod 28 moves to the point indicated by the reference numeral 28'. This movement, in turn, causes contraction of the control link 40 so as to cause the switch 70 associated therewith to be actuated and to signal the controller 108 that the vehicle door 30 has in fact been opened. The controller 108 then causes the paint robot 18 to move into position and paint the inside of the vehicle door 30. On the other hand, if the gripper 50 of the door-opener apparatus 16 has not seized the door rod 28, then the movement of the carriage 32 the distance A in the opposite direction causes the gripper 50 to move parallel to the guide rail 20 along a straight path indicated by the line B. The latter movement does not cause the control link 40 to contract and, consequently, the contacts of the switch 70 are not closed and the controller 108 does not activate the paint robot 18. Thus, it can be seen that the movement of the door-opener apparatus 16 in a direction opposite to that of normal travel provides for automatically determining whether or not the gripper 50 has seized the door rod 28.

From the above description it should be apparent that the spring 62 incorporated in the control link 40 should be one that is capable of preventing any inadvertent contraction of the control link 40 during the normal door-opening movement. It has been found that using a spring having preload force between 60 and 70 pounds is sufficient to prevent the inertia of the vehicle door 30 from collapsing the control link 40 from the fully extended position shown in FIG. 4 during the door-opening operation. In addition, it has been found that having the carriage 32 move a distance as little as approximately 100 millimeters in the opposite direction is sufficient to cause the gripper 50 to move the door rod 28 to the point indicated by the reference numeral 28' in FIG. 7. The latter movement occurs, of course, in response to the angular movement of the vehicle door 30 about its hinged connection 31.

After the inside of the vehicle door 30 has been painted, the paint robot 18 moves away from the vehicle door 30 and a signal is then given to the door-opener apparatus 16 to close the vehicle door 30. During such time, the gripper 50 moves the door rod 28 and, accordingly, the vehicle door 30, from the phantom-line position shown in FIG. 2 to the full-line position, returning the vehicle door 30 to the closed position. The gripper 50 then releases the door rod 28 and returns to the initial position, awaiting arrival of another sheet metal vehicle body which is to be painted.

Various changes and modifications can be made in this apparatus without departing from the spirit of the invention. Such changes and modifications are contemplated by the inventors, and they do not wish to be limited except by the scope of the appended claims.

The embodiments of the invention for which an exclusive property or privilege is claimed are defined as follows:

1. An apparatus for seizing and releasing an article supported for movement between a first position and a second position and comprising: a base, a primary arm having one end thereof mounted on said base for pivotal movement about a first pivot axis; a secondary arm having an intermediate portion thereof mounted on the other end of said primary arm for pivotal movement about a second pivot axis; a link comprising two axially aligned and relatively movable members, one of said members of said link being pivotally connected to said base at a point spaced from said first pivot axis for pivotal movement about a third pivot axis, and the other of said members of said link being connected to a portion of said secondary arm for pivotal movement about a fourth pivot axis; yieldable means between said members of said link for maintaining said link at a predetermined length; a gripper mounted at the free end of said secondary arm; a motor connected to said primary arm for moving said primary arm about said first pivot axis so as to cause said gripper to move towards said article under the control of said link and seize said article; and means operatively associated with said members of said link and responsive to relative movement thereof after said primary arm moves said article from said first position to said second position for providing a signal that said gripper has seized said article.

2. An apparatus for seizing and releasing a hinged portion of a vehicle body and moving said hinged portion between a first position and a second position while said vehicle body is transported along a path past said apparatus, said apparatus comprising a base movable in either direction along a track located adjacent to said path; a primary arm having one end thereof mounted on said base for pivotal movement about a first pivot axis; a secondary arm mounted on the other end of said primary arm for pivotal movement about a second pivot axis; a link having one end thereof pivotally connected to said base at a point spaced from said first pivot axis for pivotal movement about a third pivot axis, the other end of said link being connected to a portion of said secondary arm adjacent to said second pivot axis for pivotal movement about a fourth pivot axis; an article gripper mounted at the free end of said secondary arm; means carried by said secondary arm for selectively operating said article gripper for causing said gripper to seize or release said hinged portion of said vehicle body; a motor connected to said primary arm for moving said primary arm about said first pivot axis so as to cause said article gripper to move toward said hinged portion of said vehicle body under the control of said link; and means operatively associated with said link and responsive to said movement of said base after said primary arm moves said hinged portion of said vehicle body from said first position to said second position for providing a signal that said article gripper has seized said hinged portion of said vehicle body.

3. An apparatus for seizing and releasing a hinged portion of a vehicle body and moving said hinged portion between a first position and a second position while said vehicle body is transported along a path past said apparatus, said apparatus comprising a base movable in either direction along a track located adjacent to and parallel to said path; a primary arm having one end thereof mounted on said base for pivotal movement about a first vertically orientated pivot axis; a secondary arm having an intermediate portion thereof connected to the other end of said primary arm for pivotal movement about a second vertically orientated pivot axis; a link having one end thereof pivotally connected to said base at a point spaced from said first pivot axis for pivotal movement about a third vertically orientated pivot axis, the other end of said link being connected to a portion of said secondary arm adjacent to said second pivot axis for pivotal movement about a fouth vertically orientated pivot axis; an article gripper mounted at the free end of said secondary arm; means carried by said secondary arm for selectively actuating said article gripper for causing said gripper to seize or release said hinged portion of said vehicle body; a motor connected to said primary arm for moving said primary arm about said first pivot axis so as to cause said article gripper to move toward said hinged portion of said vehicle body under the control of said link; and electrical means operatively associated with said link and responsive to said movement of said base after said primary arm moves said hinged portion of said vehicle body from said first position to said second position for providing a signal that said article gripper has seized said hinged portion of said vehicle body.

* * * * *